United States Patent Office 2,994,690
Patented Aug. 1, 1961

2,994,690
HALOGENATION OF RUBBERY COPOLYMERS
Irving Kuntz, Roselle Park, N.J., assignor to Esso Research and Engineering Company, a corporation of Delaware
No Drawing. Filed Jan. 2, 1959, Ser. No. 784,423
10 Claims. (Cl. 260—85.3)

This invention relates to rubbery polymeric compositions which are halogenated low unsaturation hydrocarbon materials and particularly halogenated copolymers of isoolefins and multiolefins and to the preparation of such compositions. More particularly, the present invention relates to improved methods for halogenating butyl rubber at a rapid rate with minor proportions of certain heterocyclic N-halogeno-compounds in the presence of minor proportions of group II–a metal oxides to form gel-free products which are not degraded in molecular weight.

Butyl rubber is a copolymer of a major proportion of a $C_4$ to $C_8$ isoolefin and a minor proportion of a $C_4$ to $C_{14}$ multiolefin. These copolymers are commonly referred to in the literature as butyl rubber or GR–I rubber (Government Rubber-Isobutylene) and for example, is referred to as "butyl rubber" in the book "Synthetic Rubber" by G. S. Whitby. The expression "butyl rubber" as employed in the specification and claims is intended to include copolymers containing about 85 to 99.5 weight percent of an isoolefin (e.g., isobutylene or 2-methyl-1-butene) and about 15 to 0.5 weight percent of a multiolefin (e.g., myrcene) which is preferably a conjugated diolefin (e.g., butadiene). The preparation of butyl rubber, which is preferably the reaction product of isobutylene and isoprene, is amply described in U.S. Patent No. 2,356,128 to Thomas et al.

Butyl rubber may be improved as to covulcanizability with other rubbery polymers and particularly with high unsaturation rubbers such as diene rubbers or natural rubber by partially halogenating the butyl rubber at elevated temperatures of say about 150° to 400° F. with solid materials which are halogenating agents of the class of heterocyclic N-bromo or N-chloro organic compounds after the incorporation of these materials at lower temperatures of say about 40° to 200° F. In order for such halogenations to be performed at relatively fast rates the foregoing more elevated temperatures of 150° to 400° F. are necessary. However, such a process results in molecular weight breakdown of the butyl rubber copolymer during halogenation, in the formation of undesirably large amounts of gel, and in a dark colored product, especially when the process is carried out at temperatures of about 285° F. or higher.

In accordance with the present invention, it has now been discovered that when butyl rubber is reacted with heterocyclic N-halogeno-compounds at about 150° to 400° F., preferably at about 285° to 350° F., for about 5 seconds to 60 minutes, preferably for about 10 seconds to 30 minutes, in the presence of about 0.01 to 10 weight percent, preferably between about 0.03 to 5.0 weight percent and even more especially about 0.05 to 3.0 weight percent based on rubber of a group II–a metal oxide, preferably calcium oxide and/or even more especially magnesium oxide, high quality halogenated derivatives of butyl rubber are produced which are gel free. The halogenated butyl rubbers produced in accordance with the present invention have also been found to be undegraded in molecular weight despite the high halogenation temperatures used. They are also light in color and vulcanizable at temperatures between about 200° and 450° F. with zinc oxide alone or in admixture with carbon blacks with or without such anti-tack agents as stearic acid into vulcanizates possessing a combination of high tensile strength and elongation. The halogenated rubbery copolymers produced in accordance with the present invention have further been found to be readily covulcanizable with other rubbery polymers such as those hereinbefore mentioned to produce vulcanizates having satisfactory tensile strengths of above 1,000 p.s.i.

In a preferred embodiment of the present invention, butyl rubber is halogenated by heterocyclic N-halogeno-compounds in the presence of the above-mentioned amounts of a group II–a metal oxides at temperatures between about 285° and 375° F. and preferably between about 300° and 350° F. for times between about 15 seconds and 20 minutes and preferably between about 0.5 minute and 10 minutes. Although in the past, without using group II–a metal oxides during halogenation of butyl rubber with heterocyclic N-halogeno-compounds, it was found necessary to halogenate for 30 to 60 minutes at lower temperatures, only 10 seconds to 20 minutes are now needed since the halogenation may be performed at high temperatures without degrading the molecular weight of the butyl rubber. Also, surprisingly the bromination efficiency during reaction is increased in accordance with the present invention resulting in an increased bromine content of the butyl rubber per unit amount of added heterocyclic N-halogeno-compound.

For the purposes of the present invention, the group II–a metal oxide is chosen from the Periodic Chart of Elements listed in the Handbook of Chemistry and Physics published by the Chemical Rubber Publishing Company, 36th edition, page 392. Thus, the oxides suitable for use in the present invention include the oxides of beryllium, magnesium, calcium, strontium, barium, and radium of which magnesium and calcium are preferred.

The heterocyclic N-halogeno-compounds, useful for the purposes of the present invention, are preferably N-bromo- and/or N-chloro-compounds examples of which are 1,3-dibromohydantoin, N,N'-dibromo-5,5-dimethyl hydantoin, N.N'-dichloro-5,5-dimethyl hydantoin, N-bromo-5-methyl-5-ethyl hydantoin, N-bromo succinimide, 1,3-dichloro-5-methyl-5-isobutyl hydantoin, N-halogeno phthalimides such as N-bromo phthalimide or N-chlorophthalimide, etc.

The foregoing compounds may be generalized by the formulae:

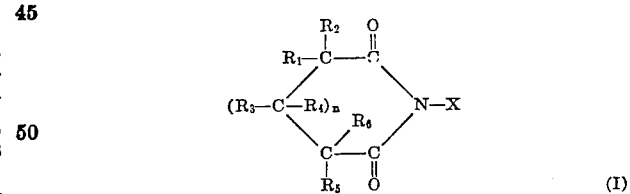

(I)

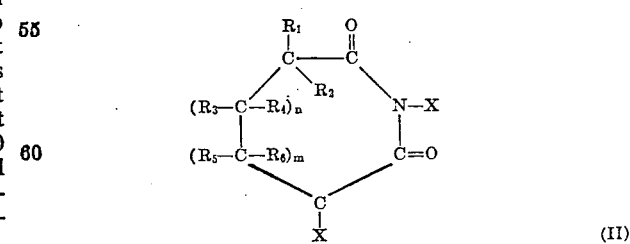

(II)

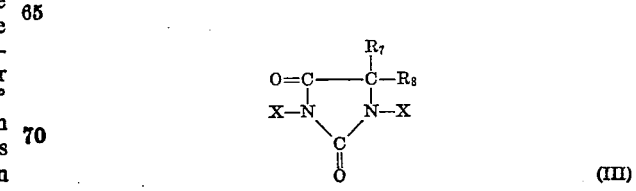

(III)

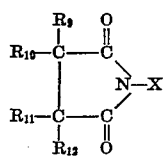

(IV)

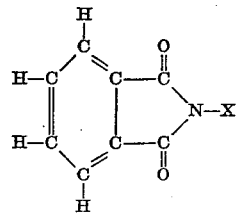

(V)

wherein $n$ and $m$ are 0 to 20, $R_1$ to $R_{12}$ being selected from the group consisting of hydrogen, and $C_1$ to $C_{18}$ alkyl, aryl, aralkyl and alkaryl groups, and X is halogen, preferably chlorine and/or bromine.

In preparing chlorinated butyl rubber or brominated butyl rubber in accordance with the present invention, the rubbery copolymer is blended with an admixture of a heterocyclic N-chloro- and/or N-bromo- compound such as those outlined above, and also with a group II–$a$ metal oxide in the amounts herein-before described, preferably at temperatures between about 50° and 150° F. and the halogenation step accomplished by raising the temperature to about 285° to 375° F. The halogenation is conducted in a manner which does not substantially degrade the molecular weight of the copolymer by regulating the amount of brominating or chlorinating agent as hereinafter more fully described. More particularly, the halogenation is carried out so as to make the resulting halogenated butyl rubber contain at least about 0.5 weight percent halogen and preferably at least about 1.0 weight percent halogen but not more than a halogen content of about 3.0 "X" weight percent bromine nor more than a halogen content of about "X" weight percent chlorine wherein:

$$X = \frac{M_3 L}{(100-L) M_1 + L(M_2 + M_3)} \times 100$$

and:

L=mole percent of the multiolefin in the polymer
$M_1$=molecular weight of the isoolefin
$M_2$=molecular weight of the multiolefin
$M_3$=atomic weight of chlorine or bromine.

Restated, the polymer should have a halogen content of at least about 0.5 weight percent, but not more than about 1 atom of chlorine nor more than 3 atoms of bromine per double bond in the copolymer. Based on the above, the amount of N-halogeno-compound employed is generally between about 0.05 and 80 weight percent, advantageously between about 0.2 and 50 weight percent and preferably between about 1.0 and 20 weight percent based on butyl rubber. The amount will depend upon the unsaturation of the butyl rubber copolymer as well as the molecular weight of the N-halogeno-compound.

The halogenated copolymer formed advantageously has a viscosity average molecular weight of between about 150,000 and 2,000,000 and a mole percent unsaturation of between about 0.2 to 15.0, advantageously about 0.4 to 10 and preferably about 0.6 to 3.0. This copolymer is substantially gel-free, has substantially the same molecular weight as the unhalogenated copolymer and when cured has excellent tensile strength, elongation, abrasion resistance, flexure resistance, gas impermeability and heat aging properties. The halogenated rubbery copolymer also has the property of being vulcanizable with zinc oxide and/or sulfur with or without other added vulcanization accelerators and is also covulcanizable with other rubbery polymers. The vulcanization of such a copolymer, halogenated in accordance with the present invention, is generally performed at temperatures between about 200° and 450° F., preferably between about 250 and 400° F. for times between about a minute up to several hours (e.g. 5.0) or more.

In order to more fully illustrate the present invention, the following experimental data are given.

Example 1

100 parts by weight of an isobutylene-isoprene butyl rubber copolymer having a mole percent unsaturation of 1.7 and a viscosity average molecular weight of 650,000 were heated at 300° F. for 5 minutes on a rubber mill with 5 parts by weight of 1,3-dibromo-5,5-dimethylhydantoin in the absence and presence of 0.5 part by weight of magnesium oxide with the following physical inspections noted before and after curing at 307° F. for 60 minutes in the presence of 50 parts by weight of SRF carbon black, 5 parts by weight of zinc oxide, 0.5 part by weight of steric acid as a processing aid and 0.5 part by weight of the antioxidant 2,2'-methylene bis(4-methyl-6-tertiary butyl phenol). The N-halogeno-compound had initially been blended with the rubber at 120°–140° F. (e.g., 130° F.). The physical inspections were as follows:

| Component | Parts by weight | |
|---|---|---|
| | Sample A (Control) | Sample B (of the invention) |
| Butyl rubber | 100 | 100 |
| Dibromohydantoin compound | 5.0 | 5.0 |
| Magnesium oxide | 0.0 | 0.5 |
| Physical characteristics: | | |
| Color of brominated butyl rubber | Black | Beige |
| Percent bromine in rubber | 1.9 | 2.6 |
| Molecular wt. (viscosity average) | 68,000 | 640,000 |
| Percent gel in rubber | 51 | 4.0 |
| Vulcanizate properties: | | |
| Tensile strength (p.s.i.) | 870 | 1,430 |
| Elongation (percent) | 280 | 460 |

The above data show that in accordance with the present invention, by halogenating in the presence of a group II–$a$ metal oxide, a lighter colored product is obtained having a greater bromine content per unit bromination agent added. Also, the product produced in accordance with the invention is substantially undegraded in molecular weight and is virtually free of gel; the resulting tensile strength and elongation being higher than that of the control containing no added group II–$a$ metal oxide during halogenation.

Example 2

The same general procedure employed in Example 1 was repeated substituting calcium oxide for magnesium oxide and using an isobutylene-isoprene butyl rubber copolymer having a mole percent unsaturation of 1.6 and a viscosity average molecular weight of 460,000. The following inspections were noted:

| Component | Parts by weight | |
|---|---|---|
| | Sample C (Control) | Sample B (of the invention) |
| Butyl rubber | 100 | 100 |
| Dibromohydantoin compound | 5.0 | 5.0 |
| Calcium oxide | 0.0 | 0.2 |
| Physical characteristics: | | |
| Color of brominated butyl rubber | Black | Beige |
| Percent bromine in rubber | 1.9 | 2.2 |
| Molecular wt. (viscosity average) | 73,000 | 455,000 |
| Percent gel in rubber | 44 | 0 |
| Vulcanizate properties: | | |
| Tensile strength (p.s.i.) | 1,040 | 1,190 |
| Elongation (percent) | 390 | 500 |
| Appearance | Rough | Smooth |

The same general comments apply as in Example 1.

What is claimed is:

1. In a process for halogenation, the improvement which comprises reacting a low unsaturation hydrocarbon polymer material of a major portion of a $C_4$ to $C_8$ isoolefin and a minor portion of a $C_4$ to $C_{14}$ multiolefin at an elevated temperature with a heterocyclic N-halogeno-compound selected from the group consisting of N-bromo- and N-chloro-compounds as the halogenating agent in the presence of a minor proportion based on hydrocarbon polymer material of a group II–$a$ metal oxide.

2. A process according to claim 1 in which the halogenating agent contains chlorine.

3. A process according to claim 1 in which the halogenating agent contains bromine.

4. A process according to claim 1 in which the low unsaturation hydrocarbon material is butyl rubber, a copolymer of 85 to 99.5 wt. percent of a $C_4$ to $C_8$ isoolefin and 15 to 0.5 wt. percent of a $C_4$ to $C_{14}$ multiolefin, the metal oxide being selected from the group consisting of magnesium oxide, calcium oxide, and mixtures thereof.

5. A process according to claim 1 in which the polymer is reacted with the heterocyclic N-halogeno-compound at about 150° to 400° F. for about 5 seconds to 60 minutes.

6. In a process for halogenating a rubbery copolymer of a major portion of a $C_4$ to $C_8$ isoolefin and a minor portion of a $C_4$ to $C_{14}$ multiolefin, the improvement which comprises reacting said rubbery copolymer at an elevated temperature with a heterocyclic N-halogeno-compound selected from the group consisting of N-bromo- and N-chloro-compounds as the halogenating agent in the presence of a minor proportion based on hydrocarbon polymer material of a group II–$a$ metal oxide.

7. A process according to claim 6 in which the halogenated copolymer formed does not contain more than about three atoms of halogen per double bond in the halogenated copolymer, the halogenation temperature being between about 285° F. and about 375° F. for between about 5 seconds and 60 minutes.

8. A process according to claim 6 in which the heterocyclic N-halogeno-compound is an N,N'-dihalo-5,5-dimethyl-hydantoin.

9. A process according to claim 6 in which about 0.01 to 10.0 weight percent based on copolymer of the group II–$a$ metal oxide is employed, the halogenation temperature being between about 300° and 350° F. for between about 15 seconds and 20 minutes.

10. A process according to claim 6 in which the N-halogeno-compound is an N-halo succinimide.

References Cited in the file of this patent

UNITED STATES PATENTS 2,833,734     Morrissey et al.     May 6, 1958